US012589827B2

(12) United States Patent (10) Patent No.: US 12,589,827 B2
Takimoto (45) Date of Patent: Mar. 31, 2026

(54) HANDLEBAR ASSEMBLY AND STRADDLED VEHICLE

(71) Applicant: YAMAHA HATSUDOKI KABUSHIKI KAISHA, Iwata (JP)

(72) Inventor: Hiroshi Takimoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 450 days.

(21) Appl. No.: 18/446,595

(22) Filed: Aug. 9, 2023

(65) Prior Publication Data

US 2023/0382485 A1 Nov. 30, 2023

Related U.S. Application Data

(63) Continuation-in-part of application No. PCT/JP2021/004895, filed on Feb. 10, 2021.

(51) Int. Cl.
*B62K 21/04* (2006.01)
*B62K 21/12* (2006.01)
*G01L 5/22* (2006.01)

(52) U.S. Cl.
CPC .............. *B62K 21/04* (2013.01); *B62K 21/12* (2013.01); *G01L 5/22* (2013.01)

(58) Field of Classification Search
CPC ........ B62K 21/04; B62K 21/12; B62K 21/00; G01L 5/22; B62J 45/411; B62J 45/422
See application file for complete search history.

(56) References Cited

U.S. PATENT DOCUMENTS

| 5,501,478 A * | 3/1996 | Doan ........................ B62M 1/00 |
| | | 280/282 |
| 2008/0296077 A1* | 12/2008 | Miyamoto ............. B62K 21/02 |
| | | 180/219 |

(Continued)

FOREIGN PATENT DOCUMENTS

| JP | H0211485 A | 1/1990 | |
| JP | 2868557 A1 * | 6/2015 | ................ B62J 6/16 |

(Continued)

OTHER PUBLICATIONS

Bryant, W.A. A Prototype Construction of Adjustable Bicycle Handlebars, Google Scholar, Thesis, University of Alaska Anchorage, Dec. 2016, pp. 1-54. (Year: 2016).*

(Continued)

*Primary Examiner* — Russell Frejd
(74) *Attorney, Agent, or Firm* — Rabin & Berdo, P.C.

(57) ABSTRACT

A handlebar assembly including: an upper bracket rotatable with a steering shaft; a handlebar extending in a left-right direction; a handle holder supporting the handlebar and including: a pair of handlebar supporting sections positioned respectively on left and right sides of the steering shaft, a main body positioned away from the handlebar supporting sections in an up-down direction view, and a pair of connecting arm sections connecting the handlebar supporting sections to the main body; a pair of supporting connecting sections connecting the handlebar supporting sections to the upper bracket, where the handle holder is displaceable in the up-down and/or lateral direction; and a body connecting section connecting the main body to the upper bracket. A distance between each of the supporting connecting sections and the body connecting section, in the up-down direction view, is greater than a sum of a width and a thickness of each connecting arm section.

7 Claims, 2 Drawing Sheets

(56)     References Cited

U.S. PATENT DOCUMENTS

| | | | | |
|---|---|---|---|---|
| 2009/0242313 A1* | 10/2009 | Morita | ................... | B62K 11/04 |
| | | | | 180/312 |
| 2009/0243253 A1* | 10/2009 | Morita | ................... | B62K 11/04 |
| | | | | 280/281.1 |
| 2011/0120257 A1 | 5/2011 | Hayashi et al. | | |
| 2018/0265152 A1 | 9/2018 | Fukuyama et al. | | |
| 2019/0084639 A1 | 3/2019 | Toyota et al. | | |
| 2019/0301903 A1 | 10/2019 | Hamaguchi et al. | | |
| 2021/0179225 A1* | 6/2021 | Hara | ...................... | B62D 37/00 |

FOREIGN PATENT DOCUMENTS

| | | |
|---|---|---|
| JP | 2018-052262 A | 4/2018 |
| WO | 2016/175263 A1 | 11/2016 |
| WO | 2020151848 A1 | 7/2020 |

OTHER PUBLICATIONS

Eikevik, A.G. Design and Optimization for Additive Manufacturing of Steering Head and Handlebar Bracket for Ducati Multistrada 1260 S, Google Scholar, Thesis, Norwegian University of Science and Technology, Jun. 2020, pp. 1-98. (Year: 2020).*

* cited by examiner

HANDLEBAR ASSEMBLY AND STRADDLED VEHICLE

CROSS-REFERENCE TO RELATED APPLICATIONS

This is a continuation-in-part application of International Application PCT/JP2021/004895, filed on Feb. 10, 2021. The contents of the application are incorporated herein by reference.

TECHNICAL FIELD

The present teaching relates to a handlebar assembly to be used in a straddled vehicle and a straddled vehicle with a handlebar assembly.

BACKGROUND ART

A straddled vehicle, for example, includes a handlebar assembly including a handlebar for steering of the front wheel. The handlebar assembly, for example, includes an upper bracket and a handle holder. A steering shaft is fixed to the upper bracket. The handle holder is positioned above the upper bracket and fastened to the upper bracket. The handle holder supports the handlebar. The handlebar is operated to rotate around the central axis of the steering shaft. Thereby, the front wheel is steered. An example of such a handlebar assembly is disclosed, for example, in International Publication WO 2016/175263.

CITATION LIST

Patent Literature

Patent Literature 1: International Publication WO 2016/175263

SUMMARY OF INVENTION

Technical Problem

Various forces act on a handlebar assembly. For example, when a handlebar is operated for steering of the front wheel, a force is enacted to rotate the handle holder relative to the upper bracket. While the straddled vehicle is in motion, a force is enacted to bring the handle holder closer to or away from the upper bracket, for example, in response to an input of change in the road surface. Thus, forces to displace the handle holder relative to the upper bracket act on the handlebar assembly. Therefore, it is preferable that the rigidity of the handle holder can, depending on the directions of forces acting on the handle holder and the like, be set appropriately.

An objective of the present teaching is to improve design freedom regarding the rigidity of the handle holder in a handlebar assembly, which includes an upper bracket to which a steering shaft is fixed, and a handle holder positioned above the upper bracket and fastened to the upper bracket.

Solution to the Problem

A handlebar assembly according to an embodiment of the present teaching is a handlebar assembly to be used in a straddled vehicle.

The handlebar assembly comprises:

an upper bracket that is fixed to a steering shaft and is arranged in such a manner so as to be rotatable around a central axis of the steering shaft together with the steering shaft;

a handlebar that is arranged to extend in a left-right direction and is operated by a rider of the straddled vehicle; and a handle holder that supports the handlebar and is positioned above the upper bracket, the handle holder including:

a pair of left and right handlebar supporting sections supporting the handlebar, the left and right handlebar supporting sections being positioned more leftward and more rightward, respectively, than the central axis of the steering shaft;

a main body that is positioned away from each of the left and right handlebar supporting sections of the pair in an up-down direction view, the up-down direction being defined as a direction in which the central axis of the steering shaft extends; and a pair of left and right connecting arm sections connecting the left and right handlebar supporting sections of the pair, respectively, to the main body;

the handle holder being configured in such a manner that each of the left and right handlebar supporting sections of the pair is connected to the upper bracket via a supporting connecting section, which allows the handle holder to be displaceable in at least either the up-down direction or a lateral direction at the supporting connecting section and that the main body is connected to the upper bracket via a body connecting section;

wherein each of the left and right connecting arm sections of the pair has a configuration such that a member length, which is a length of a portion connecting the supporting connecting section and the body connecting section in the up-down direction view, is greater than a sum of a width and a thickness of the connecting arm section.

In the handlebar assembly, the handle holder is, for example, made of metal. The handle holder has a higher rigidity than an elastic member such as a rubber bush or the like. The member length is greater than the sum of the width and the thickness of the connecting arm section. Accordingly, the connecting arm sections of the handle holder are adjustable in such a manner that the flexural rigidity in the up-down direction and/or the lateral direction lessens. Thus, with regards to the handle holder, the flexural rigidity can be adjustable within a relatively high range. In other words, the flexural rigidity of the handle holder can be adjustable while its rigidity is able to be maintained at a relatively high level. The lateral direction, for example, includes a direction in which the handlebar is turned around the body connecting section. Adjusting the flexural rigidity in the up-down direction and/or the lateral direction of the connecting arm sections makes it possible to both adjust the operability of the handlebar, and adjust the ease of operation of the handlebar. The handle holder may include an elastic member as will be described later in the description of embodiments or may not include an elastic member. In the handlebar assembly, only by means of design of the handle holder, it is possible to adjust the rigidity in supporting the handlebar. Therefore, it is possible to adjust the rigidity in supporting the handlebar by adjusting the rigidity of only the handle holder without use of an elastic member. Meanwhile, it is also possible to adjust the overall rigidity in supporting the handlebar by additional use of an elastic member. In this way, it is possible to improve design freedom regarding the rigidity of the handle holder in the handlebar assembly. The handlebar, for example, may be a single handlebar extending in the left-right direction continuously across the straddled vehicle, or may include a left handlebar and a right handlebar that are separately positioned on the left and on the right, respectively, of the straddled vehicle. The left handlebar is supported by the left handlebar supporting section of the pair of left and right handlebar supporting sections. The right handlebar is supported by the right handlebar supporting section of the pair of left and right handlebar supporting sections.

The left-right direction is defined as a direction in which the handlebar extends.

The supporting connecting section and the body connecting section are configured to connect the upper bracket and the handle holder in such a manner that when the handlebar is operated to rotate around the central axis of the steering shaft, the force for the operation applied to the handlebar is transmitted to the upper bracket via the handle holder, whereby the upper bracket rotates around the central axis of the steering shaft together with the steering shaft. The upper bracket is referred to also as a top bridge or a handle crown.

The pair of left and right handlebar supporting sections includes a left handlebar supporting section and a right handlebar supporting section. The left handlebar supporting section is positioned more leftward than the central axis of the steering shaft and supports the handlebar. The right handlebar supporting section is positioned more rightward than the central axis of the steering shaft and supports the handlebar.

The pair of left and right connecting arm sections includes a left connecting arm section and a right connecting arm section. The left connecting arm section connects the left handlebar supporting section to the main body. The right connecting arm section connects the right handlebar supporting section to the main body. A connection part to the main body may be shared by the left and right connecting arm sections of the pair. In other words, the left connecting arm section and the right connecting arm section may include a shared end part connected to the main body.

The supporting connecting section is, for example, a connecting shaft as will be described later in the description of embodiments. The connecting shaft, for example, has a central axis extending in the up-down direction. The connecting shaft connects the left/right handlebar supporting section and the upper bracket in such a manner as to allow the left/right handlebar supporting section to be displaced in at least either the up-down direction or a lateral direction. The connecting shaft is a separate body from the upper bracket and from the handle holder. The supporting connecting section may be a separate body from the upper bracket and from the handle holder. The supporting connecting section may be integrated with the upper bracket and the handle holder. The supporting connecting section may be integrated with either one of the upper bracket and the handle holder and separate from the other of the upper bracket and the handle holder.

The supporting connecting section, for example, connects the upper bracket and the handlebar supporting section in such a manner so as to allow a relative displacement between the upper bracket and the handlebar supporting section. A relative displacement between the upper bracket and the handlebar supporting section is made possible, for example, by a configuration in which the upper bracket and the handlebar supporting section are connected to each other with a space between the upper bracket and the handlebar supporting section. The space between the upper bracket and the handlebar supporting section may be, for example, a space that allows the handlebar supporting section to move in the up-down direction towards the upper bracket or a space that allows the handlebar supporting section to be displaced relative to the upper bracket in a direction perpendicular to the up-down direction. Connecting the upper bracket and the handle holder via the supporting connecting section includes, for example, a case in which a displacement of the handlebar supporting section relative to the upper bracket can be made possible with a restricted degree of displacement. The displacement of the handlebar supporting section relative to the upper bracket may be a displacement in the up-down direction or a displacement in a direction perpendicular to the up-down direction. A displacement of the upper bracket relative to the handlebar supporting section can be made possible, for example, by a configuration in which a space is formed between the handlebar supporting section and the upper bracket, or a space is formed either between the handlebar supporting section to which the supporting connecting section is fixedly mounted and the upper bracket, or between the upper bracket to which the supporting connecting section is fixedly mounted and the handlebar supporting section. The displacement is not necessarily made possible only by providing a material softer than the supporting connecting section between the handlebar supporting section and the upper bracket, or by providing said material either between the handlebar supporting section to which the supporting connecting section is fixedly mounted and the upper bracket, or between the upper bracket to which the supporting connecting section is fixedly mounted and the handlebar supporting section. The material softer than the supporting connecting section is, for example, an elastic material. If a space is formed, a member of such a material can be inserted in the space to fill a part of the space. Such a member is used, for example, to determine the relative positions of the handlebar supporting section and the upper bracket. In this case, a relative displacement between the handlebar supporting section and the upper bracket is limited, for example, up to a point where the space is no longer there. Connecting the upper bracket and the handle holder via the supporting connecting section includes, for example, a case in which the relative positions of the handlebar supporting section and the upper bracket are kept before and after a displacement of the handlebar supporting section relative to the upper bracket. The case in which the supporting connecting section keeps the relative positions of the handlebar supporting section and the upper bracket before and after a displacement of the handlebar supporting section relative to the upper bracket includes, for example, a case in which the supporting connecting section is kept fixedly mounted to either one member of the handlebar supporting section or the upper bracket, while the supporting connecting section is partially received in the up-down direction in the other member before and after a displacement of the handlebar supporting section relative to the upper bracket. Connecting the upper bracket and the handlebar supporting section via the supporting connecting section, for example, does not include fixing the handlebar supporting section to the upper bracket, such a fixing being that which doesn't allow displacement of the handlebar supporting section relative to the upper bracket. The supporting connecting section may connect the handlebar supporting section and the upper bracket, for example, without any intervention of a member softer than the supporting connecting section. The supporting connecting section may connect the handlebar supporting section and the upper bracket, for example, without any intervention of an elastic member.

The body connecting section is, for example, a torque input shaft or a body connecting shaft, as will be described later in the description of embodiments. The torque input shaft or body connecting shaft has a central axis extending, for example, in the up-down direction. The torque input shaft or body connecting shaft connects the upper bracket and the main body in such a manner that when the handlebar is operated to rotate around the central axis of the steering shaft, the force for the operation applied to the handlebar is transmitted to act in a direction to twist the torque input shaft or body connecting shaft around the central axis via the main body rotating around the central axis. The torque input shaft or body connecting shaft is a separate body from the upper bracket and from the handle holder. The torque input shaft or body connecting shaft may be a separate body from the upper bracket and from the handle holder. The torque input shaft or body connecting shaft may be integrated with the upper bracket and the handle holder. The torque input shaft or body connecting shaft may be integrated with either one of the upper bracket or the handle holder, and be separate from the other.

The body connecting section can connect the main body and the upper bracket, for example, without any intervention of a member softer than the body connecting section. The body connecting section can connect the main body and the upper bracket, for example, without any intervention of an elastic member. Connecting the main body and the upper bracket via the body connecting section includes, for example, fastening the main body to the upper bracket via the body connecting section. Fastening the main body to the upper bracket via the body connecting section includes, for example, fastening the body connecting section to the main body and to the upper bracket. Fastening the main body to the upper bracket via the body connecting section allows, for example, a relative displacement between the main body and the upper bracket caused by a displacement of the body connecting section itself. The displacement of the body connecting section itself is caused, for example, by a force applied to the body connecting section from the main body when the rider of the straddled vehicle operates the handlebar. For example, when the body connecting section is shaped like a shaft extending in the up-down direction, the displacement of the body connecting section itself may be a twist around its central axis or may be a bending displacement in a direction perpendicular to the central axis. When the body connecting section twists around the central axis, the handlebar supporting section is displaced relative to the upper bracket in a direction perpendicular to the up-down direction. When the body connecting section bends and is displaced in a direction perpendicular to the central axis, the handlebar supporting section is displaced relative to the upper bracket in the up-down direction.

The member length is, for example, a length of a portion of the handle holder connecting the supporting connecting section and the body connecting section in the up-down direction view. The member length is, for example, the length of a line connecting the centers of the respective outlines of the body connecting section and the supporting connecting section with each other in the up-down direction view. The line connecting the centers of the respective outlines of the body connecting section and the supporting connecting section with each other in the up-down direction view is defined as a reference line. The reference line is, for example, a line formed by connecting widthwise center points of the portion connecting the body connecting section and the supporting connecting section of the handle holder in the up-down direction view. The reference line, for example, includes a line formed by connecting widthwise center points of the connecting arm section through the entire length in the direction in which the connecting arm section extends. For example, in the up-down direction view, the reference line has not only a part that covers the handle holder, but other parts that cover the body connecting section and that cover the supporting connecting section. For example, the reference line is set in such a manner that its length is minimized. For example, when a hole is formed in the handle holder, the reference line is set with the hole regarded as not being formed. In other words, when the handle holder has a hole, the reference line may cover the hole in the up-down direction view. The reference line may not necessarily be a straight line. The reference line may have an arc-like curve, partly. The length of the connecting arm section is, for example, a dimension in the direction in which the connecting arm section extends in the up-down direction view. The length of the connecting arm section is, for example, a length of an overlapping part of the reference line with the connecting arm section in the up-down direction view. The length of the connecting arm section is shorter than the member length. The length of the connecting arm section is, for example, greater than the sum of a width and a thickness of the connecting arm section.

The width of the connecting arm section is, for example, a width of the connecting arm section at the center or in a center portion with respect to the direction in which the connecting arm section extends in the up-down direction view. The width of the connecting arm section means, for example, a dimension in the direction perpendicular to the direction in which the connecting arm section extends in the up-down direction view. The width of the connecting arm section is measured, for example, based on the outline of a cross section of the connecting arm section at the center or in a center portion with respect to the direction in which the connecting arm section extends in the up-down direction view, the cross section being along the direction perpendicular to the direction in which the connecting arm section extends in the up-down direction view. For example, when cross sections along the direction perpendicular to the direction in which the connecting arm section extends in the up-down direction view that are obtained at different positions in the direction in which the connecting arm section extends in the up-down direction view have different outlines, the smallest one of the outlines of these cross sections is used as the outline of a cross section for measurement of the width of the connecting arm section. The width of the connecting arm section is, for example, the maximum width of the outline of the cross section. The width of the connecting arm section is, for example, smaller than the length of the connecting arm section.

The thickness of the connecting arm section is, for example, a thickness at the center or in a center portion with respect to the direction in which the connecting arm section extends in the up-down direction view. The thickness of the connecting arm section means a dimension in the up-down direction of the connecting arm section. The thickness of the connecting arm section is measured, for example, based on the outline of a cross section of the connecting arm section at the center or in a center portion with respect to the direction in which the connecting arm section extends in the up-down direction view, the cross section being along the direction perpendicular to the direction in which the connecting arm section extends in the up-down direction view. For example, when cross sections along the direction perpendicular to the direction in which the connecting arm section extends in the up-down direction view that are obtained at different positions in the direction in which the connecting arm section extends in the up-down direction view have different outlines, the smallest one of the outlines of these cross sections is used as the outline of a cross section for measurement of the thickness of the connecting arm section. The thickness of the connecting arm section is, for example, the maximum thickness of the outline of the cross section. The thickness of the connecting arm section is, for example, smaller than the length of the connecting arm section.

The handlebar assembly according to the embodiment of the present teaching, for example, may be further configured as follows:

with regard to each of the left and right handlebar supporting sections of the pair, the supporting connecting section is fixedly mounted to either one member of the handlebar supporting section or the upper bracket while the supporting connecting section is partially received in the up-down direction in the other member; and the handlebar supporting section and the upper bracket are arranged with a space in between so as to be displaceable in the up-down direction to come closer to each other.

In this configuration, a displacement in the up-down direction between each of the left and right handlebar supporting sections of the pair and the upper bracket is made possible, and it is possible for the pair of left and right connecting arm sections to be bent, thereby displacing the pair of left and right handlebar supporting sections in the up-down direction relative to the upper bracket. This can result in alleviation of jolts which the straddled vehicle receives from the road surface while running.

The space is formed in such a manner as to allow the handlebar supporting section and the upper bracket to be displaced in the up-down direction to come closer to each other. The size of the space can be adjustable, for example, adjusted by changing the state of connection between the main body and the upper bracket via the body connecting section. Changing the state of connection between the main body and the upper bracket via the body connecting section includes, for example, changing the position of the main body that is fastened to the body connecting section in the up-down direction. The size of the space can be adjustable, for example, adjusted by changing the ratio of the received part to the whole of the supporting connecting section, the received part being received in either one of the handlebar supporting section and the upper bracket. In other words, the size of the space can be adjustable by changing the length of the portion of the supporting connecting section protruding from either one of the handlebar supporting section and the upper bracket towards the other member. For example, when the supporting connecting section includes a connecting shaft with a thread part screwed to either one of the handlebar supporting section and the upper bracket, and a collar in which the connecting shaft is inserted, it is possible for the length of the portion of the supporting connecting section protruding from either one of the handlebar supporting section and the upper bracket towards the other member to be changed by changing the length of the collar.

The handlebar assembly with the above-described configuration, for example, may be further configured as follows:

with regard to each of the left and right handlebar supporting sections of the pair, the supporting connecting section includes a flange part protruding in the lateral direction from either one of the received part or a protruding part, the received part being received in the other member, the protruding part being extended from the received part to the outside of the other member; and the flange part is configured to engage with the other member in the up-down direction when the handlebar supporting section and the upper bracket are displaced in the up-down direction to part from each other.

In this configuration, the flange part functions as a stopper. Accordingly, a displacement of the handlebar supporting section to part from the upper bracket can be limited.

The flange part, for example, is included in a collar as will be described later in the description of embodiments. A connecting shaft is inserted in the collar, and the collar is inserted in a positioning ring. When the connecting shaft is connected to the handlebar supporting section, the collar determines the positions of the handlebar supporting section and the upper bracket in such a manner that a space exists between the handlebar supporting section and the upper bracket with respect to the up-down direction.

The handlebar assembly according to the embodiment of the present teaching, for example, may be further configured as follows:

with regard to each of the left and right handlebar supporting sections of the pair, the supporting connecting section is fixedly mounted to either one member of the handlebar supporting section or the upper bracket while the supporting connecting section is partially received in the up-down direction in the other member; and a space existing between the supporting connecting section and the other member with respect to the lateral direction includes a filled part filled with an elastic member and an unfilled gap, and is configured in such a manner that when the supporting connecting section is displaced in the lateral direction, the elastic member is partly compressed and deformed in the direction in which the supporting connecting section is displaced, thereby bringing the supporting connecting section into contact with the other member, which causes the gap to be non-existence.

In this configuration, while the positional relationship between the supporting connecting section and the other member in the lateral direction is regulated by the elastic member, a relative displacement in the lateral direction between the supporting connecting member and the other member can be made possible. Moreover, the relative displacement in the lateral direction between the supporting connecting member and the other member can be restricted by making contact between the supporting connecting member and the other member. This suppresses too strong a steering torque caused by an operation of the handlebar conducted by the rider of the straddled vehicle from being applied to the body connecting section.

The lateral direction is a direction perpendicular to the up-down direction and includes the left-right direction and a front-rear direction.

The elastic member is, for example, a positioning ring. The positioning ring is formed of a material softer than the connecting shaft, and when the connecting shaft is inserted and displaced in the lateral direction, the positioning ring is partly compressed and deformed in the direction in which the connecting shaft is displaced. The connecting shaft connects the handlebar supporting section and the upper bracket in such a manner that displacement of the handlebar supporting section is made possible in the lateral direction. When the connecting shaft is displaced in the lateral direction, thereby causing partial compression and deformation of the positioning ring, the connecting shaft is brought into contact with the upper bracket, and in this way, the lateral displacement of the connecting shaft is limited.

The handlebar assembly according to the embodiment of the present teaching, for example, may further include:

a torque sensor that detects a steering torque applied to the body connecting section when the handlebar is operated to rotate around the central axis of the steering shaft.

In this configuration, information about steering torque can be acquired, and for example, it is possible to assist the rider of the straddled vehicle in operating the handlebar, in accordance with the acquired information about steering torque.

The handlebar assembly according to the embodiment of the present teaching, for example, may be further configured:

each of the left and right connecting arm sections of the pair has a configuration such that the thickness is smaller than the width.

In this configuration, the left and right connecting arm sections of the pair are easy to bend in the up-down direction. Accordingly, it is possible for the rigidity in the up-down direction of the handle holder to be decreased.

A straddled vehicle according to an embodiment of the present teaching includes any one of the handlebar assemblies described above.

The straddled vehicle is, for example, a vehicle with a saddle seat. The straddled vehicle is, for example, a vehicle with which a seat is straddled when the rider is seated on the vehicle. The straddled vehicle includes, for example, scooters, mopeds, snowmobiles, water-crafts, all-terrain vehicles, and so on. The straddled vehicle, for example, has at least one front wheel and at least one rear wheel. The straddled vehicle is not limited to two-wheeled vehicles and may be a three-wheeled vehicle having a left-right pair of wheels as the front or rear wheels. The straddled vehicle may be a four-wheeled vehicle with a left-right pair of front wheels and a left-right pair of rear wheels. The straddled vehicle may be, for example, a leaning vehicle. The leaning vehicle is a vehicle including a vehicle body that leans leftward when the vehicle turns left and leans rightward when the vehicle turns right. The straddled vehicle may include a drive source. The drive source may be an engine, an electric motor, or a combination of an engine and an electric motor.

Some embodiments of the present teaching will hereinafter be described in detail with reference to the drawings, and the detailed description of the embodiments will provide a clearer picture of the above-mentioned object and other objects, the features, the aspects and the advantages of the present teaching. The term "and/or" used herein includes one of the associated items in a list and all possible combinations of the associated items. The terms "including", "comprising", or "having", and variations thereof used herein specify the presence of stated features, steps, operations, elements, components, and/or equivalents thereof, and can include one or more of steps, operations, elements, components, and/or their groups. Unless otherwise defined, all terms (including technical and scientific terms) used herein have the same meanings as commonly understood by one of ordinary skill in the art to which the present teaching pertains. It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein. It should be understood that the description of the present teaching discloses a number of techniques and steps. Each of these has an individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching can improve design freedom regarding the rigidity of the handle holder in a handlebar assembly, which includes an upper bracket to which a steering shaft is fixed, and a handle holder positioned above the upper bracket and fastened to the upper bracket.

DESCRIPTION OF EMBODIMENTS

A straddled vehicle with a handlebar assembly according to an embodiment of the present teaching will hereinafter be described in detail with reference to the drawings. The embodiment described below is merely an example. The present teaching shall not be considered as being limited to the embodiment below.

Figure 1:
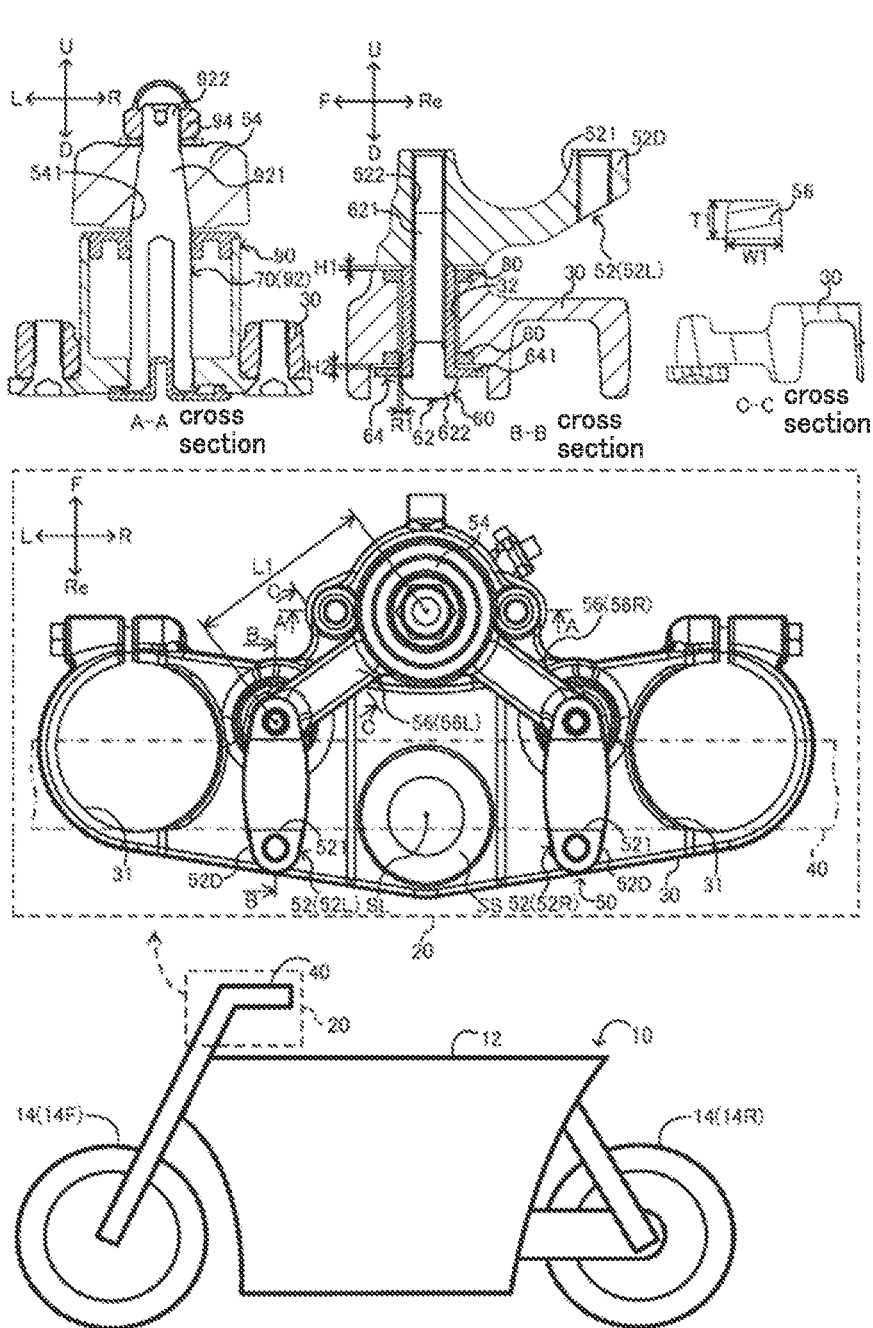
FIG. 1 shows a schematic view showing the framework of a straddled vehicle with a handlebar assembly according to an embodiment of the present teaching, a plan view of the handlebar assembly, and sectional views of the handlebar assembly.

With reference to FIG. 1, a straddled vehicle 10 according to an embodiment of the present teaching will be described. The straddled vehicle 10 includes a vehicle body 12 and a plurality of wheels 14.

The vehicle body 12 supports the plurality of wheels 14. The plurality of wheels 14 includes a front wheel 14F serving as a steerable wheel and a rear wheel 14R serving as a drive wheel. The front wheel 14F, which serves as a steerable wheel, is steered in accordance with operation of a handlebar 40 conducted by the rider of the straddled vehicle 10. The rear wheel 14R, which serves as a drive wheel, is rotated by power transmitted from a power unit (not shown) supported by the vehicle body 12, and thereby, the straddled vehicle 10 moves.

The vehicle body 12 includes a handlebar assembly 20. In other words, the straddled vehicle 10 includes a handlebar assembly 20. Thus, the handlebar assembly 20 is employed in the straddled vehicle 10.

The handlebar assembly 20 includes an upper bracket 30, a handlebar 40, and a handle holder 50. In the following paragraphs, the direction in which a steering shaft SS extends will be referred to as up-down direction, and among the directions perpendicular to the direction in which the steering shaft SS extends, the direction in which the handlebar 40 extends will be referred to as left-right direction.

The upper bracket 30 is fixed to the steering shaft SS. The upper bracket 30 is arranged in such a manner as to be rotatable around the central axis SL of the steering shaft SS together with the steering shaft SS. In the example shown by FIG. 1, the upper bracket 30 supports the upper end part of a front fork (not shown). Specifically, the upper bracket 30 includes a pair of left and right supporting sections 31. Each of the left and right supporting sections 31 of the pair has a hole extending overall in the up-down direction. The front fork is fixed to the upper bracket 30 with its upper end parts inserted in the holes of the left and right supporting sections 31.

The handlebar 40 is positioned in such a manner as to extend in the left-right direction. The handlebar 40 is operated by the rider of the straddled vehicle 10.

The handle holder 50 supports the handlebar 40 and is positioned above the upper bracket 30. The handle holder 50 includes a pair of left and right handlebar supporting sections 52, a main body 54, and a pair of left and right connecting arm sections 56.

The left and right handlebar supporting sections 52 of the pair are positioned more leftward and more rightward, respectively, than the central axis SL of the steering shaft SS. Thus, the pair of left and right handlebar supporting sections 52 includes a left handlebar supporting section 52L positioned more leftward than the central axis SL of the steering shaft SS and a right handlebar supporting section 52R positioned more rightward than the central axis SL of the steering shaft SS. The pair of left and right handlebar supporting sections 52 supports the handlebar 40. In the example shown by FIG. 1, each of the left and right handlebar supporting sections 52 of the pair includes a lower supporting portion 52D and an upper supporting portion (not shown). A groove 521 extending in the left-right direction is formed in the lower supporting portion 52D. The upper supporting portions are fixed to the lower supporting portions 52D with the handlebar 40 fitted in the grooves 521. In this way, the handlebar 40 is supported by the upper supporting portions and the lower supporting portions 52D.

In the up-down direction view, the main body 54 is positioned away from each of the left and right handlebar supporting sections 52 of the pair. In the example shown by FIG. 1, the main body 54 is positioned more frontward than the pair of left and right handlebar supporting sections 52. In other words, the rear edge of the main body 54 is at a more frontward position than the respective front edges of the left and right handlebar supporting portions 52 of the pair. The main body 54 is positioned more frontward than the steering shaft SS. The distance from the main body 54 to the left handlebar supporting section 52L is equal to the distance from the main body 54 to the right handlebar supporting section 52R.

The left and right connecting arm sections 56 of the pair connect the left and right handlebar supporting sections 52 of the pair, respectively, to the main body 54. In the example shown by FIG. 1, the pair of left and right connecting arm sections 56 includes a left connecting arm section 56L connecting the left handlebar supporting section 52L to the main body 54 and a right connecting arm section 56R connecting the right handlebar supporting section 52R to the main body 54. The left connecting arm section 56L connects the lower supporting portion 52D of the left handlebar supporting section 52L to the main body 54. The left connecting arm section 56L is formed integrally with the lower supporting portion 52D of the left handlebar supporting section 52L and with the main body 54. The right connecting arm section 56R connects the lower supporting portion 52D of the right handlebar supporting section 52R to the main body 54. The right connecting arm section 56R is formed integrally with the lower supporting portion 52D of the right handlebar supporting section 52R and with the main body 54.

Each of the left and right connecting arm sections 56 of the pair is connected to the upper bracket 30 via a supporting connecting section 60. Accordingly, in the example shown by FIG. 1, the handlebar assembly 20 further includes a pair of left and right supporting connecting sections 60. The respective lower supporting portions 52D of the left and right handlebar supporting sections 52 of the pair are connected to the upper bracket via supporting connecting sections 60. Specifically, the lower supporting portion 52D of the left handlebar supporting section 52L is connected to the upper bracket 30 via a supporting connecting section 60. The lower supporting portion 52D of the right handlebar supporting section 52R is connected to the upper bracket 30 via a supporting connecting section 60.

With regard to each of the left and right handlebar supporting sections 52 of the pair, the supporting connecting 60 is fixedly mounted to either one of the handlebar supporting section 52 and the upper bracket 30 with a part of the supporting connecting section 60 received in the up-down direction in the other member. In the example shown by FIG. 1, the supporting connecting section 60 is fixedly mounted to the handlebar supporting section 52 with a part of the supporting connecting section 60 received in the up-down direction in the upper bracket 30. In this case, "either one of the handlebar supporting section 52 and the upper bracket 30" is the handlebar supporting section 52 (i.e., the "first member"), and "the other member" (i.e., the "second member") is the upper bracket 30.

The supporting connecting section 60 includes a connecting shaft 62 and a collar 64. The connecting shaft 62 extends in the up-down direction. The connecting shaft 62 has a thread part 621 with a thread ridge. The thread part 621 is located at an axial end part of the connecting shaft 62. The connecting shaft 62 has a head 622 at the other axial end part. In the handlebar supporting section 52, a screw hole 522 with a thread groove is formed. The thread part 621 is screwed in the thread hole 522, and thereby, the connecting shaft 62 is fixedly mounted to the handlebar supporting section 52. In this state, a part of the connecting shaft 62 is protruded out of the handlebar supporting section 52.

The connecting shaft 62 is partly inserted in the collar 64. The collar 64 extends in the up-down direction and, as a whole, has a cylindrical shape. An axial end (upper end) of the collar 64 is in contact with the handlebar supporting section 52. The other axial end (lower end) of the collar 64 is in contact with the head 622. Thus, the collar 64 is held by the handlebar supporting section 52 and the head 622. In other words, a movement of the collar 64 in the axial direction of the connecting shaft 62 (in the up-down direction) is restricted between the handlebar supporting section 52 and the head 622. Then, in this state, a space H1 exists between the handlebar supporting part 52 and the upper bracket 30. The space H1 permits the handlebar supporting section 52 and the upper bracket 30 to move in the up-down direction towards each other. Thus, the handlebar supporting section 52 and the upper bracket 30 are arranged with a space H1 in between so as to be displaceable in the up-down direction to come closer to each other.

The collar 64 includes a flange 641. The flange 641 is located around the "other axial end" of the collar 64. Thus, the supporting connecting section 60 has a flange 641 as a flange part protruding in a lateral direction from the part of the supporting connecting section 60 protruded out of the upper bracket 30, which is the "other member". The lateral direction means a direction perpendicular to the axial direction of the connecting shaft 62. The axial direction of the connecting shaft 62 is parallel to the direction in which the central axis SL of the steering shaft SS extends.

When the collar 64 is held by the handlebar supporting section 52 and the head 622, a space H2 exists between the flange 641 and the upper bracket 30. The space H2 permits the handlebar supporting section 52 and the upper bracket 30 to move in the up-down direction away from each other. The flange 641 is configured in such a manner that when the handlebar supporting section 52 and the upper bracket 30 are displaced in the up-down direction to separate from each other, the flange 641 engages with the upper bracket which is the "other member", in the up-down direction.

The supporting connecting section 60 is partly inserted in the upper bracket 30. A part of the supporting connecting section 60 is placed in a through hole 32 formed in the upper bracket 30. Therefore, a lateral movement of the supporting connecting section 60 is restricted by the upper bracket 30. Accordingly, a lateral movement of the handlebar supporting section 52 to which the supporting connecting section 60 is fixedly mounted is restricted.

A space between the supporting connecting section 60 and the upper bracket 30, which is the "other member", with respect to the lateral direction includes a filled part filled with an elastic member 80 and an unfilled gap. In the example shown by FIG. 1, the space between the collar 64 and the upper bracket 30 with respect to the lateral direction includes a filled part filled with an elastic member 80 and an unfilled gap. The unfilled gap is defined as a gap R1.

The elastic member 80 is, for example, shaped like a ring. The elastic member 80 is placed between the collar 64 and the upper bracket 30 with respect to the lateral direction. The elastic member 80 is in contact with the collar 64 and with the upper bracket 30. This determines the position of the collar 64 in the lateral direction relative to the upper bracket 30. Thus, the elastic member 80 functions to determine the position of the supporting connecting section 60 in the lateral direction relative to the upper bracket 30.

In the example shown by FIG. 1, a pair of upper and lower elastic members 80 is provided for each of the supporting connecting sections 60. The upper and lower elastic members 80 of the pair are arranged to be away from each other in the axial direction of the connecting shaft 62. The unfilled gap of the space between the collar 64 and the upper bracket 30 with respect to the lateral direction, that is, the gap R1 exists between the upper and lower elastic members 80 of the pair.

When the supporting connecting section 60 is displaced in the lateral direction, the elastic members 80 are partly compressed and deformed in the lateral direction. Thereby, the supporting connecting section 60 is brought into contact with the "other member" (the upper bracket 30), and the gap lessens. In the example shown by FIG. 1, the connecting shaft 62 and the collar 64 in which the connecting shaft 62 is inserted move in the lateral direction, and the collar 64, which is in contact with the elastic members 80, compresses and deforms some part of the elastic members 80. In other words, the elastic members 80 are partly pressed flat between the collar 64 and the upper bracket 30. Thereby, the gap R1 lessens, and the collar 64 comes into contact with the upper bracket 30. Then, the lateral movement of the connecting shaft 62 and the collar 64 is restricted.

The main body 54 is connected to the upper bracket 30 via a body connecting section 70. In other words, the handlebar assembly 20 further includes a body connecting section 70. In the example shown by FIG. 1, the body connecting section 70 is a torque input shaft 92 that is a component of a torque sensor 90. In other words, the handlebar assembly 20 further includes a torque sensor 90. When the handlebar 40 is operated to rotate around the central axis SL of the steering shaft SS, the torque sensor 90 detects the steering torque applied to the body connecting section 70 (torque input shaft 92). The torque sensor 90 is fixed to the upper bracket 30. The torque input shaft 92 extends in the up-down direction. The torque input shaft 92 as a whole has a cylindrical shape. The torque input shaft 92 has a tapered part 921 in an axially middle portion. The tapered part 921 has a taper surface that increases the diameter of the torque input shaft 92 as the distance from one axial end (upper end) of the torque input shaft 92 increases and the distance from the other axial end (lower end) of the torque input shaft 92 decreases. The tapered part 921 is inserted in a through hole 541 formed in the main body 54. The tapered part 921 is in contact with the inner peripheral surface of the main body 54. In this state, the main body 54 is fixed to the torque input shaft 92. Specifically, a nut 94 is fastened to a thread part 922 formed at and around the "one axial end" (upper end) of the torque input shaft 92, and thereby, the main body 54 is held between the nut 94 and the taper surface of the tapered part 921. An operation of the handlebar 40 conducted by the rider is transmitted from the handle holder 50 supporting the handlebar 40 to the upper bracket 30 via the torque sensor 90 having the torque input shaft 92. With rotation of the upper bracket 30, the steering shaft SS fixed to the upper bracket 30 rotates. When the main body 54 rotates around the central axis of the torque input shaft 92 in accordance with an operation of the handlebar 40, a torque (force) to twist the torque input shaft 92 around its central axis is transmitted from the main body 54 to the torque input shaft 92. The torque sensor 90 detects the twist of the torque input shaft 92 at that time, and in this way, the torque sensor 90 detects a steering torque.

Each of the left and right connecting arm sections 56 of the pair has a configuration such that a member length L1, which is a length of a portion connecting the supporting connecting section 60 and the body connecting section 70 in the up-down direction view, is greater than the sum of a width W1 and a thickness T1 of the connecting arm section 56. In the example shown by FIG. 1, the member length L1 is the length of a line connecting the center of the body connecting section 70 (center of the torque input shaft 92) and the center of the supporting connecting section 60 (center of the connecting shaft 62 and the collar 64) in the up-down direction view. Each of the left and right connecting arm sections 56 of the pair has a configuration such that the thickness T1 is smaller than the width W1.

In the handlebar assembly 20, the member length L1 is greater than the sum of the width W1 and the thickness T 1. Therefore, in the handle holder 50, which is relatively high in rigidity, the connecting arm sections 56 are adjustable in such a manner as to have a lower flexural rigidity in the up-down direction and/or in the lateral direction. Thus, the handlebar assembly 20 is improved in the flexibility in designing the rigidity of the handle holder 50.

(Modification of Handlebar Assembly)

Figure 2:
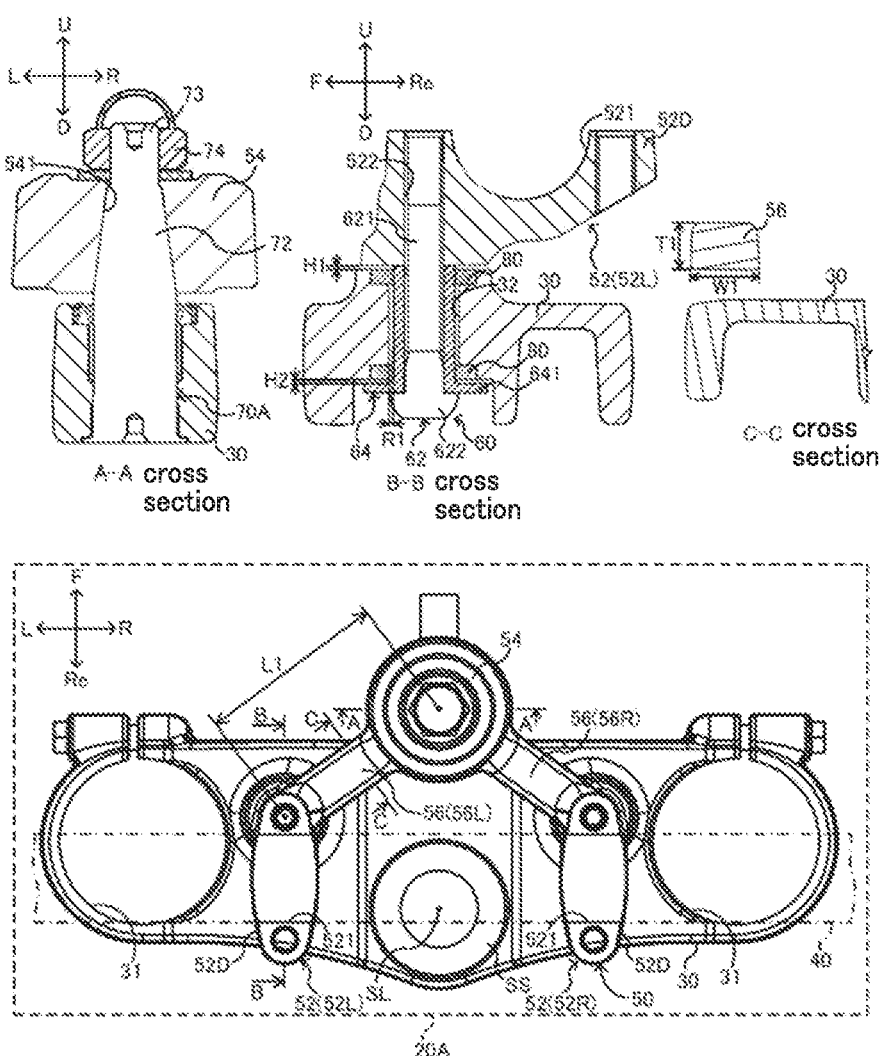
FIG. 2 shows a plan view of a handlebar assembly and sectional views of the handlebar assembly.

With reference to FIG. 2, a handlebar assembly 20A according to a modification will be described. As compared with the handlebar assembly 20, the handlebar assembly does not include a torque sensor 90. Instead, the handlebar assembly 20A includes a body connecting shaft 70A as a body connecting section.

The body connecting shaft 70A is fixed to the upper bracket 30. The body connecting shaft 70A extends in the up-down direction. The body connecting shaft 70A as a whole has a cylindrical shape. The body connecting section 70A has a tapered part 72 in an axially middle portion. The tapered part 72 has a taper surface that increases the diameter of the body connecting section 70A as the distance from one axial end (upper end) of the body connecting section 70A increases and the distance from the other axial end (lower end) of the body connecting section 70A decreases. The tapered part 72 is inserted in the through hole 541 formed in the main body 54. The tapered part 72 is in contact with the inner peripheral surface of the main body 54. In this state, the main body 54 is fixed to the body connecting section 70A. Specifically, a nut 74 is fastened to a thread part 73 formed at and around the "one axial end" (upper end) of the body connecting section and thereby, the main body 54 is held between the nut 74 and the taper surface of the tapered part 72. An operation of the handlebar 40 conducted by the rider is transmitted from the handle holder 50 supporting the handlebar 40 to the upper bracket 30 via the body connecting shaft 70A. With rotation of the upper bracket 30, the steering shaft SS fixed to the upper bracket 30 rotates.

The handlebar assembly 20A with this structure produces the same effect as produced by the above-described embodiment.

OTHER EMBODIMENTS

The embodiments and modifications described above and/or illustrated by the drawings are to make the present disclosure easier to understand and not to limit the concept of the present disclosure. It is possible to adapt or alter the embodiments and modifications described above without departing from the gist thereof. The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments and modifications described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

In the embodiment described above, for example, each of the connecting arm sections 56 may connect the upper supporting portion of the handlebar supporting section 52 to the main body 54.

In the modification described above, for example, when the main body 54 rotates around the central axis of the body connecting shaft 70A in accordance with an operation of the handlebar 40, a displacement of at least one of the handlebar supporting section 52, the main body 54 or the connecting arm sections 56 may be detected by a Hall IC. The Hall IC is attached to the upper bracket 30. The Hall IC preferably detects a displacement of the main body 54.

For example, in the embodiment described above, instead of the elastic members a jig may be provided and used for the positioning in the lateral direction of the supporting connecting section 60 relative to the upper bracket 30.

LIST OF REFERENCE SIGNS

10: straddled vehicle
20: handlebar assembly
30: upper bracket
32: through hole
40: handlebar
50: handle holder
52: handlebar supporting section
54: main body
56: connecting arm section
60: supporting connecting section
70: body connecting section
80: elastic member

The invention claimed is:

1. A handlebar assembly to be used in a straddled vehicle having a steering shaft, the handlebar assembly comprising:

an upper bracket that is fixed to the steering shaft and is arranged to be rotatable around a central axis of the steering shaft together with the steering shaft;

a handlebar that is arranged to extend in a left-right direction of the straddled vehicle and is operable by a rider of the straddled vehicle;

a handle holder that supports the handlebar and that is positioned above the upper bracket in an up-down direction of the straddled vehicle, which is a direction in which the central axis of the steering shaft extends, the handle holder including:

a pair of handlebar supporting sections supporting the handlebar, the pair of handlebar supporting sections being positioned respectively on left and right sides of the steering shaft in the left-right direction;

a main body that is positioned away from each of the handlebar supporting sections in an up-down direction view, which is a view of the straddled vehicle in the up-down direction; and a pair of connecting arm sections connecting the pair of handlebar supporting sections, respectively, to the main body, each connecting arm section having a width and a thickness;

a pair of supporting connecting sections, respectively corresponding to the pair of the handlebar supporting sections and connecting the pair of the handlebar supporting sections to the upper bracket, the handle holder being displaceable in at least either the up-down direction or a lateral direction at each of the supporting connecting sections; and a body connecting section connecting the main body to the upper bracket, wherein a distance between each of the supporting connecting sections and the body connecting section, in the up-down direction view, is greater than a sum of the width and the thickness of said each connecting arm section.

2. The handlebar assembly according to claim 1, wherein:
for each of the handlebar supporting sections,
  the corresponding supporting connecting section is
    fixedly mounted to a first member, while being
    partially received in the up-down direction in a
    second member, where
    the first member is the upper bracket and the second
      member is said each handlebar supporting section,
      or
    the first member is said each handlebar supporting
      section and the second member is the upper
      bracket; and
  said each handlebar supporting section and the upper
    bracket are arranged with a space therebetween so as
    to be displaceable in the up-down direction.

3. The handlebar assembly according to claim 2, wherein:
the corresponding supporting connecting section includes
  a flange part protruding in the lateral direction from a
  received part or a protruding part, wherein
the received part is received in the second member,
the protruding part extends from the received part to an
  outside of the second member, and
the flange part is configured to engage with the second
  member in the up-down direction when said each
  handlebar supporting section and the upper bracket are
  displaced in the up-down direction to be apart from
  each other.

4. The handlebar assembly according to claim 1, wherein:
for each of the handlebar supporting sections,
  the corresponding supporting connecting section is
    fixedly mounted to a first member, while being partially received in the up-down direction in a
  second member, where
    the first member is the upper bracket and the second
      member is said each handlebar supporting section,
      or
    the first member is said each handlebar supporting
      section and the second member is the upper
      bracket; and
  the corresponding supporting connecting section and
    the second member has, therebetween in the lateral
    direction, a filled part filled with an elastic member,
    which is configured in such a manner that when the
    corresponding supporting connecting section is dis-
    placed in the lateral direction, the elastic member is
    partly compressed and deformed to thereby bring the
    corresponding supporting connecting section into
    contact with the second member, so as to eliminate
    any gap therebetween.

5. The handlebar assembly according to claim 1, further
comprising:
  a torque sensor that detects a steering torque applied to the
    body connecting section when the handlebar is oper-
    ated to rotate around the central axis of the steering
    shaft.

6. The handlebar assembly according to claim 1, wherein:
for said each connecting arm section, the thickness is
  smaller than the width.

7. A straddled vehicle comprising
the handlebar assembly according to claim 1.

* * * * *